United States Patent [19]

Cope

[11] Patent Number: 4,722,854

[45] Date of Patent: Feb. 2, 1988

[54] MOLDING COATING COMPOSITION AND PROCESS

[75] Inventor: Carroll W. Cope, Marion, Va.

[73] Assignee: DG Shelter Products, Marion, Va.

[21] Appl. No.: 13,330

[22] Filed: Feb. 11, 1987

Related U.S. Application Data

[62] Division of Ser. No. 753,326, Jul. 9, 1985, abandoned, which is a division of Ser. No. 567,279, Dec. 30, 1983, Pat. No. 4,546,133.

[51] Int. Cl.$^4$ .................. C09D 3/10; C09D 3/12; C09D 3/16; B05D 5/00
[52] U.S. Cl. .................. 427/280; 427/408; 428/511; 428/512; 428/513; 428/535
[58] Field of Search ............... 428/535, 481, 511, 512, 428/513; 427/280, 408

[56] References Cited

U.S. PATENT DOCUMENTS

| | | | |
|---|---|---|---|
| 1,888,864 | 11/1932 | Mizener | 427/280 |
| 1,934,414 | 11/1933 | Fess | 427/280 |
| 4,430,375 | 2/1984 | Scher et al. | 427/280 |
| 4,473,601 | 9/1984 | Kanatsu et al. | 427/280 |
| 4,581,255 | 4/1986 | Coggan et al. | 427/408 |

*Primary Examiner*—Delbert R. Phillips
*Assistant Examiner*—Nathan M. Nutter
*Attorney, Agent, or Firm*—Flehr, Hohbach, Test, Albritton & Herbert

[57] ABSTRACT

Compositions and methods are provided for forming a coated wood product having the appearance and texture of wood grain, which conceals joints on the wood surface and which is capable of accepting conventional wood stain.

3 Claims, No Drawings

MOLDING COATING COMPOSITION AND PROCESS

This is a division of Ser. No. 753,326, filed July 9, 1985, now abandoned, which in turn is a division of Ser. No. 567,279, filed Dec. 30, 1983, now U.S. Pat. No. 4,546,133.

The present invention is directed to a method and compositions used therewith for coating wood and applying a wood grain pattern thereto to produce a surface which conceals joints in the wood, but which is capable of receiving conventional wood stains.

In the decorative uses of wood, there are many applications in which visible joints in the wood are not desired. For example, in the use of moldings along the edges of doors, window frames, door frames, and the like, it is desirable to have each edge constructed of a single length of wood. Moreover, to have a decorative effect, the wood is often stained to a desired color, such as walnut, rosewood, and the like, then covered with a protective coating such as varnish or other conventional clear coating. The use of single lengths of wood is expensive and wasteful, since short lengths of scrap wood are not reusable. There is no practical alternative to using single lengths of wood for moldings. Plastics or compounded wood pulp products are not desirable since they either do not have sufficient strength and durability or do not have the pleasing wood grain surface texture. A piece of plywood would also be extremely expensive since one or more surfaces of the moulding would have to be veneered, making it much more expensive than a solid piece of wood.

The use of scrap pieces of wood joined together, such as by fingerjoints, would be desirable. However, heretofore such joined pieces have not had the appearance, nor have been capable of being treated to have the appearance, of a single piece of wood for decorative uses. Of course, if the joined pieces of wood are to be painted with an opaque color, then the use of joined pieces does not matter. However, in most cases the wood appearance and texture need to be maintained. This gives rise to the heretofore unsolved problem of, on the one hand, having to conceal the joint, but on the other hand, having to maintain the appearance and texture of a single piece of wood. Methods of application of coatings to a joined piece of wood known in the prior art, while concealing the joint, also destroy the wood grain texture. Thus, even if a pattern of wood grain could be printed onto the coating, the "grainy" appearance of the wood would be covered by the coating. Also, the versatility of such a coated piece of wood is reduced since the color of the wood remains that of the color of the coating with the printed wood grain pattern because the coating and printed pattern would not satisfactorily accept a stain. Thus, different coatings would have to be made to simulate different colors of wood such as pine, oak, walnut, rosewood, and the like. Not only would this be expensive, but it also introduces the problem of nonuniformity from batch to batch. In housing construction, it is desirable that all the wood trim have the same appearance. Therefore, it would be desirable to have a coating which would also accept conventional wood stains. Such a coating was not heretofore known.

The process and compositions according to the present invention are useful for coating joined pieces of wood without the above problems.

It is therefore an object of the present invention to provide compositions which are useful for coating wood to conceal joints, but which retain the grainy texture of the natural wood.

It is a further object of the present invention to provide novel coatings for wood which accept conventional wood stains.

It is a further object of the present invention to provide novel printing compositions, which, when used in combination with the foregoing novel coating composition provide the appearance and texture of wood and accept conventional wood stains.

These and other objects will be apparent from the following description and preferred embodiments.

The present invention is directed to compositions for coating wood surfaces and methods of use therefore. In particular, compositions are provided for coating wood surfaces, which compositions comprise at least one polymer selected from the group consisting essentially of a polysaccharide, polysaccharide ether, polysaccharide ester, and a polymer derived from at least one unsaturated monomer; at least one inorganic mineral; nutshell flour; vegetable oil; alkyd resin; and a mixture of volatile organic solvents and esters. A printing composition is also provided comprising at least one polymer from the group consisting essentially of a polysaccharide, polysaccharide ether, and polysaccharide ester; silicone fluid; colorant; a nonvolatile organic ester; and a mixture of volatile organic solvents. These compositions are used to form coated wood products which have the appearance and texture of natural wood, yet conceal joints and are capable of accepting conventional wood stains.

A method is provided for forming the coated wood products comprising the steps of applying a novel liquid coating onto natural wood, evaporating the volatile solvents to form a solid coating, and applying a novel ink composition in a wood grain pattern to the solid coating.

The starting material for forming a wood product according to the present invention may be any product having a wood surface, including wood strips, with or without joints, wood sheets, including plywood and wood grained paper, or any other product derived from wood or wood pulp, sawdust and the like. Since a primary purpose for use of the compositions according to the present invention is to provide a decorative surface, it is desirable that the starting material have a wood grained texture, since that texture will be substantially retained after the coating is applied according to the present invention.

While not intending to be limited to a particular theory of operation, it is believed that the texture of the wood surface is retained by a partial absorption of the liquid coating into the interstices of the natural wood grain so that the natural wood grain is substantially repeated onto the surface of the coating when dried. Additionally, it is believed that the residual solid matter, which is retained in the coating on the surface of the wood, retains an overall wood texture, yet is capable of accepting the grain ink formulation according to the present invention, as well as conventional wood stains.

Generally, the wood product to be treated is first coated by a liquid composition basecoat according to the present invention. The basecoat is then dried to remove volatile solvents. The drying is preferably performed with heat in a conventional oven, but other evaporative methods may be utilized. Then the grain ink formulation is applied in a pattern to simulate wood grain using a conventional roller having a wood grain pattern. Apparatus for performing these functions are conventional and known in the art.

The basecoat fiormulation according to the present invention comprises the following components:

(1) At least one polymer selected from the group consisting essentially of a polysaccharide, polysaccharide ether, a polysaccharide ester, and a polymer derived from at least one unsaturated polymer;

(2) at least one inorganic mineral;

(3) nutshell flour;

(4) vegetable oil;

(5) alkyd resin;

(6) a mixture of volatile organic solvents and esters.

The polysaccharide, polysaccharide ether and polysaccharide ester may be selected from cellulose or cellulose derivatives, such as methylcellulose, ethylcellulose, hydroxyalkyl ethers of cellulose, cellulose esters, such as nitrocellulose, hydroxyalkyl cellulose esters, starch, dextran, guar, agar, agarose, tragacanth, xanthan, and the like. Preferably, a cellulose ester is used, such as nitrocellulose.

In place of or in addition to the foregoing polymer, the basecoat composition may also contain a polymer derived from at least one unsaturated monomer. Such a polymer may be derived from a single monomer, such as acrylic acid or acrylic esters, maleic acid or maleic esters. Other polymers derived from polymerizable monomers containing an ethylenic bond may be used. The polymer may also be a co-polymer or a terpolymer of mixtures of polymerizable monomers. Such polymers, co-polymers or terpolymers are commercially available and/or known in the art and may range in molecular weight from 1,000 to 1,000,000 MW units. Preferably a maleic resin comprising polymerized maleic acid monomers is used having a molecular weight in the range of 320 to 360.

It is preferred that two polymers be used, one being a polysaccharide, polysaccharide ether or polysaccharide ester, and other being a polymer derived from an ethylenic monomer, described above. The preferred polymers are maleic resin of a molecular weight from 320 to 360 and nitrocellulose of a molecular weight from 460,000 to 595,000.

The basecoat composition will also contain inorganic minerals and salts, which are believed to be primarily for forming the texture of the basecoat. Such minerals may be selected from silica ($SiO_2$), titanium dioxide, calcium carbonate, talc and the like. Preferably, mixtures of silica, titanium dioxide, calcium carbonate and talc will be used in various amounts depending upon the type of wood to which the basecoat is to be applied and the method of applying the basecoat. Particularly, it will be within the skill of those of ordinary skill in the art to adjust the amount of minerals and mineral salts to achieve the desired texture and effect.

Another component of the basecoat will be pulverized nutshell, preferably in the form of a fine powder. Typical grain size of the powder will be 42 to 46 microns. Preferably, pecan shell flour will be used. While not intending to be bound by a particular theory, it is believed that the pecan shell flour is critical in that it provides a natural substance as an ingredient of the basecoat, which possibly assists in the acceptance of the basecoat of natural stains.

Further components of the basecoat are a natural vegetable oil and alkyd resin. The vegetable oils may be derivatized in the form of alkyds, which are polyesters formed by esterifying the acid and/or alcohol portions of the components of the natural vegetable oil. Such alkyds derived from natural oils are commercially available, such as Reichhold ® P-222. Preferably, the basecoat will contain both a natural oil, such as soybean oil, and a natural oil alkyd, such as alkyd of coconut.

The remainder of the basecoat comprises volatile solvents and esters, of a kind and in an amount sufficient to dissolve and/or suspend the various components into a uniform liquid suspension. It is desirable that the solvents comprise some polar solvents, such as methanol and butanol, nonpolar aromatic solvents, such as toluene and xylene, and slightly polar solvents, such as ketones, including acetone methyl ethyl ketone and the like. Other higher molecular weight solvents may also be utilized, such as petroleum distillates, in particular lactol spirits, which are commercially available; esters, such as isobutyl isobutyrate, isobutyl acetate, and the like, which assist in dissolving or suspending the resins.

Finally, the basecoat composition may contain other conventional additives such as suspending agents (such as Bentone ®), dispersing agents (such as polyethylene), antifoaming agents (such as silicone), and air-releasing agents (such as silicone). These agents are to assist in the uniform dispersion of the components within the composition and to provide a uniform, smooth coating once applied to the wood surface.

The particular proportions of the various components used may be generally in the proportions used below. It will be understood, however, that various modifications in proportions and components may be utilized without departing from the scope of the present invention. A typical basecoat composition comprises:

| | | |
|---|---|---|
| Isobutyl alcohol | 2.6 | gallons |
| Lactol spirits | 28.6 | gallons |
| Ethanol | 24.4 | gallons |
| Toluene | 37.6 | gallons |
| Xylene | 16.0 | gallons |
| Methanol | 24.8 | gallons |
| Silica flatting agent | 103.0 | pounds |
| Maleic resin | 246.3 | pounds |
| R. S. Nitrocellulose | 335.4 | pounds |
| Methyl ethyl ketone | 5.8 | gallons |
| Acetone | 45.6 | gallons |
| Isobutyl isobutyrate | 9.7 | gallons |
| Isobutyl acetate | 4.8 | gallons |
| Blown soya bean oil | 16.7 | gallons |
| Coconut, alkyd | 10.0 | gallons |
| Dispersing aid (Modified Polyester Resin (Rohm & Haas)) | 2.4 | pounds |
| Suspending aid (Bentone ®) | 6.5 | pounds |
| Titanium dioxide | 119.0 | pounds |
| Calcium carbonate | 99.0 | pounds |
| Talc | 81.6 | pounds |
| Air releasing agent (7219 Henkel) | 5.6 | pounds |
| Pecan shell flour is added to the above mix in the amount of 113.5 grams per gallon. | | |

The above composition may be derived by mixing two commercially available components, a sealer known as Nitrocellulose Sealer, available from DG Shelter Products, and a coating composition known as Pigmented Lacquer Basecoat, also from DG Shelter Products. Typically, two-thirds by volume of Nitrocellulose Sealer with one-third by volume of Pigmented Lacquer Basecoat will be admixed and pecan shell flour will be added in the amount of approximately 113.5 grams per gallon.

A preferred basecoat composition will contain the following:

|  | Gallons | Pounds |
|---|---|---|
| Short coconut oil alkyd | 2.755 | |
| Modified Polyester Dispersant (Rohm & Haas) | .083 | |
| Ethanol | 6.936 | |
| Treated clay | | .870 |
| Titanium dioxide pigment | | 27.158 |
| Calcium carbonate | | 27.304 |
| China clay pigment | | 22.505 |
| Wax paint additive (Polyethylene) | | .988 |
| Silicone-free flooding/floating agent (Rohm & Haas) | | .058 |
| Lactol spirits | 7.926 | |
| Toluene | 10.376 | |
| Xylene | 3.310 | |
| Methanol | 6.843 | |
| Silica | | 28.405 |
| Nitrocellulose, ½ Sec. | | 92.503 |
| Maleic resin | 7.190 | |
| Isobutyl acetate | 3.524 | |
| Acetone | 12.519 | |
| Isobutyl isobutyrate | 2.011 | |
| Methyl ethyl ketone | 17.011 | |
| Air release agent (7219 Henkel) | .141 | |
| Soybean oil | 4.609 | |
| Yellow oxide | Trace | |
| Lamp black | Trace | |
| Red oxide | Trace | |
| TOTAL | 100.000 | 816.970 |

Pecan shell flour will be added to the above mix in the amount of 113.5 grams/gallon.

After applying the basecoat to the wood, it is dried, for example, in a conventional oven to remove the volatile solvents, thereby forming a hardened basecoat. An ink formulation is then applied to the basecoat with a roller having a wood grain pattern. The ink formulation comprises:

(1) At least one polymer selected from a group consisting essentially of a polysaccharide, polysaccharide ether and polysaccharide esters;
(2) silicone fluid;
(3) colorant;
(4) a nonvolatile organic ester; and
(5) a mixture of volatile organic solvents.

The polysaccharide, polysaccharide ether and polysaccharide ester used in the ink formulation may be selected from the same group as described above in connection with the present composition. Such a polymer may be the same as or different from that which is used in the basecoat. Preferably, nitrocellulose is utilized as the polymer in the printing composition.

The printing formulation also contains a silicone fluid. While various silicone fluids are commercially available, it is preferred that the silicone fluid used in the ink formulation have a viscosity in a range of about 350 to 360 centistokes.

The colorant which is utilized in the ink formulation will depend upon the color of the woodgrain desired. The colorant must, of course, impart a color to the ink formulation which is different from the color of the desired basecoat in order to provide contrast. Usually, colorants which impart yellow or brown tones to the basecoat will be useful. Typically, the basecoat, after application of the ink formulation, will be stained with a conventional wood stain, which usually enhances the contrast between the basecoat and the ink. Colorants may be typical inorganic oxides, such as inorganic yellow oxide, commercially available as Mineral Pigments M-1110 (Pfizer).

The ink formulation will usually also contain a nonvolatile organic ester. It is believed that such a component will assist in dissolving and/or suspending the polymer and silicone components. Typically, an ester derived from an aromatic acid and a long-chain alkanol will be utilized. The preferred ester is dioctyl phthalate.

Finally, the ink formulation will contain a mixture of a volatile organic solvents. As in the case of the basecoat formulation, the solvent will usually comprise some polar solvents, some nonpolar solvents, and some slightly polar solvents. A typical combination would be one or more of the glycol ether solvents, commonly known as Cellosolve ® (2-ethoxyethanol), and in particular butyl Cellosolve ® (2-butoxyethanol), combined with an aromatic solvent, such as toluene, or xylene, and a slightly polar solvent, such as a ketone, in particular, methyl amyl ketone.

A typical ink formulation may comprise the following:

| Mixture A | |
|---|---|
| Butyl Cellosolve ® | 30.4 Gallons |
| Methyl amyl ketone | 2.0 Gallons |
| Dioctyl phthalate | 2.2 Gallons |
| R.S. Nitrocellulose | 58.0 Pounds |
| Yellow oxide paste | 60.0 Gallons |
| Mixture B | |
| Butyl Cellosolve ® | 48.5 Gallons |
| Toluene | 48.5 Gallons |
| Silicone fluid | 3.0 Gallons |
| The Mixture B is added in the amount of 2 fluid ounces per quart to Mixture A. | |

The preferred procedure for forming the ink formulation is to combine the butyl Cellusolve, methyl amyl ketone, dioctophthalate, nitrocellulose and oxide paste together to form a uniform mixture. More butyl Cellusolve, toluene and the silicone fluid are combined separately and then added in an amount of 2 oz. per quart to the first mixture.

After application of the graining ink formulation and air drying, the final wood product may be utilized as is, or stained with a conventional wood stain, then coated with a conventional varnish or other clear preservative.

The basecoat and ink formulation may be applied to any wood surface, including paper, if desired.

Having described the specific embodiments of the invention, other modifications and variations will be apparent to those of ordinary skill in the art, which variations and modifications are intended to be within the scope of the present invention.

What is claimed is:

1. A coated wood product comprising a wood substrate, a coating over said substrate comprising at least one polymer selected from a group consisting essentially of a polysaccharide, polysaccharide ether, polysaccharide ester, and a polymer derived from at least one unsaturated monomer; at least one inorganic mineral; nut shell flour; and alkyd resin.

2. A coated wood product according to claim 1 further comprising a printed pattern upon said coating, said pattern formed of material comprising at least one polymer selected from the group consisting essentially of a polysaccharide, polysaccharide ether and polysaccharide ester; silicone fluid; colorant; and a nonvolatile organic ester.

3. A method of forming a coated wood product characterized by a printed wood grain pattern comprising the steps of:

(a) applying a liquid coating onto a wood product, said coating comprising at least one polymer selected from a group consisting essentially of a polysaccharide, polysaccharide ether, polysaccharide ester, and a polymer derived from at least one unsaturated monomer; at least one inorganic mineral; nut shell flour; vegetable oil; alkyd resin; and a mixture of volatile organic solvents and esters;

(b) evaporating said volatile solvents to form a solid coating;

(c) applying an ink composition in a wood grain pattern onto said solid coating, said ink composition comprising at least one polymer selected from a group consisting essentially of a polysaccharide, polysaccharide ether, and polysaccharide ester; silicone fluid; colorant; a nonvolatile organic ester; and a mixture of volatile organic solvents.

* * * * *